United States Patent
Henkel et al.

(10) Patent No.: US 11,053,131 B2
(45) Date of Patent: Jul. 6, 2021

(54) PROCESS FOR THE PREPARATION OF SODIUM CYANIDE

(71) Applicant: CyPlus GmbH, Darmstadt (DE)

(72) Inventors: Jens Henkel, Meuselbach-Schwarzmühle (DE); Jürgen Rassbach, Arnstadt (DE); Klaus Trenkmann, Rudolstadt (DE); Markus Jafeld, Frechen (DE); Bernd Glöckler, Bruchköbel (DE)

(73) Assignee: CyPlus GmbH, Darmstadt (DE)

( * ) Notice: Subject to any disclaimer, the term of this patent is extended or adjusted under 35 U.S.C. 154(b) by 0 days.

(21) Appl. No.: 16/898,281

(22) Filed: Jun. 10, 2020

(65) Prior Publication Data
US 2020/0299144 A1 Sep. 24, 2020

Related U.S. Application Data

(63) Continuation of application No. 15/575,594, filed as application No. PCT/EP2016/062935 on Jun. 8, 2016, now abandoned.

(30) Foreign Application Priority Data

Jun. 18, 2015 (DE) ...................... 10 2015 211 231.4

(51) Int. Cl.
| | | |
|---|---|---|
| *C01C 3/10* | (2006.01) | |
| *C01C 3/02* | (2006.01) | |
| *B01D 21/26* | (2006.01) | |
| *B01D 53/14* | (2006.01) | |
| *B01D 53/96* | (2006.01) | |
| *B01D 9/00* | (2006.01) | |

(52) U.S. Cl.
CPC .............. *C01C 3/10* (2013.01); *B01D 9/0031* (2013.01); *B01D 21/262* (2013.01); *B01D 53/1456* (2013.01); *B01D 53/1493* (2013.01); *B01D 53/96* (2013.01); *C01C 3/0212* (2013.01); *B01D 2251/604* (2013.01); *B01D 2257/408* (2013.01)

(58) Field of Classification Search
CPC ......... C01C 3/0212; C01C 3/10; B01D 53/96; B01D 53/1493; B01D 2257/408; B01D 21/262; B01D 9/0031; B01D 2251/604; B01D 53/1456
See application file for complete search history.

(56) References Cited

U.S. PATENT DOCUMENTS

| | | | | |
|---|---|---|---|---|
| 2,993,754 | A | 7/1961 | Jenks et al. | 423/379 |
| 3,619,132 | A | 11/1971 | Mann et al. | 423/371 |
| 4,083,935 | A | 4/1978 | Makar | 423/379 |
| 4,748,815 | A | 6/1988 | Junior et al. | 60/692 |
| 4,847,062 | A | 7/1989 | Rogers et al. | 423/379 |
| 10,730,758 | B2 * | 8/2020 | Henkel | C01C 3/10 |
| 2006/0246385 | A1 | 11/2006 | Gaur et al. | 431/5 |
| 2010/0296995 | A1 | 11/2010 | Allison et al. | 423/379 |
| 2018/0155205 | A1 | 6/2018 | Henkel et al. | |

FOREIGN PATENT DOCUMENTS

| | | | | |
|---|---|---|---|---|
| CN | 102502708 A | 6/2012 | | C01C 3/08 |
| CN | 103073027 A | 5/2013 | | C01C 3/10 |
| CN | 102502708 B | 11/2013 | | C01C 3/08 |
| EP | 0309126 A1 | 3/1989 | | C01C 3/10 |

OTHER PUBLICATIONS

The Notification Concerning Transmittal of International Preliminary Report on Patentability (Chapter I of the Patent Cooperation Treaty), in English, dated Dec. 28, 2017, which was issued by the International Bureau of WIPO in Applicant's corresponding international PCT application having Serial No. PCT/EP2016/062935, filed on Jun. 8, 2016.

The English translation of the International Preliminary Report on Patentability (Chapter I of the Patent Cooperation Treaty), dated Dec. 19, 2017, which was issued by the International Bureau of WIPO in Applicant's corresponding international PCT application having Serial No. PCT/EP2016/062935, filed on Jun. 8, 2016.

The Written Opinion of the International Searching Authority, in English, dated Aug. 8, 2016, which was issued by the International Bureau of WIPO in Applicant's corresponding international PCT application having Serial No. PCT/EP2016/062935, filed on Jun. 8, 2016.

The International Search Report, in English, dated Aug. 8, 2016, which was issued by the International Bureau of WIPO in Applicant's corresponding international PCT application having Serial No. PCT/EP2016/062935, filed on Jun. 8, 2016.

The Notification Concerning Transmittal of International Preliminary Report on Patentability (Chapter I of the Patent Cooperation Treaty), in English, dated Dec. 28, 2017, which was issued by the International Bureau of WIPO in Applicant's related international PCT application having Serial No. PCT/EP2016/062939, filed on Jun. 8, 2016.

The English translation of the International Preliminary Report on Patentability (Chapter I of the Patent Cooperation Treaty), dated Dec. 19, 2017, which was issued by the International Bureau of WIPO in Applicant's related international PCT application having Serial No. PCT/EP2016/062939, filed on Jun. 8, 2016.

The Written Opinion of the International Searching Authority, in English, dated Aug. 23, 2016, which was issued by the International Bureau of WIPO in Applicant's related international PCT application having Serial No. PCT/EP2016/062939, filed on Jun. 8, 2016.

(Continued)

Primary Examiner — Timothy C Vanoy
(74) Attorney, Agent, or Firm — Bodner & O'Rourke, LLP; Gerald T. Bodner; Christian P. Bodner

(57) ABSTRACT

The invention relates to a process for the preparation of alkali metal cyanides as a solid substance, comprising the steps of: i) an absorption step in the form of an absorption of hydrogen cyanide from a hydrogen cyanide-containing synthesis gas in an aqueous alkali metal hydroxide solution; ii) a crystallization step in the form of introducing said alkali metal cyanide solution into an evaporative crystallizer; iii) a separation step; iv) a recycle step; v) a drying step.

28 Claims, No Drawings

(56) References Cited

OTHER PUBLICATIONS

The International Search Report, in English, dated Aug. 23, 2016, which was issued by the International Bureau of WIPO in Applicant's related international PCT application having Serial No. PCT/EP2016/062939, filed on Jun. 8, 2016.

* cited by examiner

PROCESS FOR THE PREPARATION OF SODIUM CYANIDE

CROSS-REFERENCE TO RELATED APPLICATIONS

This application is a continuation of co-pending U.S. patent application Ser. No. 15/575,594, filed on Nov. 20, 2017, and titled, "Process For The Preparation Of Sodium Cyanide", which claims the benefit of priority, under 35 U.S.C. 371, to international PCT Application Serial No. PCT/EP2016/062935, filed on Jun. 8, 2016, which in turn claims priority to German Patent Application Serial No. 10 2015 211 231.4, filed on Jun. 18, 2015, the disclosure of each of which is hereby incorporated by reference and on which priority is hereby claimed.

The present invention relates to a method for producing alkali metal cyanides as solids and alkali metal cyanides produced according to this method.

Alkali metal cyanides have numerous applications. One particularly important area of application is the use for obtaining gold, silver, and other metals in cyanide leaching. Other areas of application are electroplating technology and also hardening steel. Alkali metal cyanides find numerous applications as a starting material in chemical synthesis. One example here is the use for the synthesis of nitriles, which have manifold applications in the chemical industry. One alkali metal cyanide which is particularly industrially important is sodium cyanide.

One important method for producing alkali metal cyanides uses the reaction of hydrogen cyanide HCN (hydrocyanic acid) with alkali metal hydroxides. An array of methods has been described in the prior art for the industrial production of HCN as a starting substance for this synthesis of alkali metal cyanides. One particularly frequently used method is the so-called Andrussow method. In the Andrussow method, the production of HCN is performed by catalyzed reaction of methane, ammonia, and air oxygen. In this case, a mixture of ammonia and methane is typically brought to reaction at high temperatures on platinum nets with injection of oxygen. The synthesis product produced directly by the Andrussow method represents a mixture of multiple components in this case, wherein in particular unreacted ammonia, hydrogen, nitrogen, and carbon oxides are present in addition to the desired reaction product HCN.

According to the methods described in the prior art for producing alkali metal cyanides, a procedure is generally followed in which the HCN-containing reaction gas is liquefied by cooling after the reaction and subsequently the hydrocyanic acid is purified. Complex purification methods, for example, rectification, are necessary for this purpose. The liquid hydrocyanic acid thus purified is then, according to this method from the prior art, brought to reaction with alkali metal hydroxide, typically sodium hydroxide, to obtain sodium cyanide. If the sodium cyanide is to be produced as a solid, crystallization thus has to be performed in a further step. To create as little cyanide-containing waste as possible, the sodium cyanide mother liquor can be recirculated after the recrystallization into the reaction container in which the liquefied hydrocyanic acid is brought to reaction with sodium hydroxide. However, according to the method described in the prior art, this procedure does not result in a closed loop, since byproducts, for example, sodium formate, become enriched in the course of multiple recirculation cycles, so that after a certain time, the sodium cyanide mother liquor can no longer be recirculated. The sodium cyanide mother liquor thus contaminated by byproducts then has to be disposed of in a costly and environmentally-harmful manner.

This disposal is particularly complex because sodium cyanide and other alkali metal cyanides are highly toxic. In general, the disposal is performed by adding hydrogen peroxide, wherein the sodium cyanide is oxidized to form sodium cyanate. In some circumstances, still further steps are necessary before a final disposal of the detoxified wastewater can be performed. This results in a high cost expenditure.

Alternative embodiments are also described in the prior art, in which the Andrussow reaction gas per se is brought to reaction with a sodium hydroxide solution to produce sodium cyanide. This process control has heretofore only been implemented in a few cases and has heretofore exclusively been used to sell the sodium cyanide solution which results from the reaction of the gas containing hydrocyanic acid with the sodium hydroxide directly as a final product. A method control in which the Andrussow reaction gas is brought to reaction in the gas phase with sodium hydroxide and solid sodium cyanide was produced as a final product has heretofore not been implemented. The reason that such a reaction control has heretofore been implemented rather rarely in the prior art can be seen above all in the difficulty with regard to the contamination of the sodium cyanide mother liquor. Due to the direct reaction of the Andrussow reaction gas in the gas phase with the sodium hydroxide, byproducts arise which either also precipitate as a contaminant during the crystallization of the sodium cyanide or remain as a contaminant in the sodium cyanide mother liquor. These contaminants which remain in the sodium cyanide mother liquor have the result that recirculation of the sodium cyanide mother liquor is only possible to an extremely limited extent, because such a recirculation would result in the further steady enrichment of the byproducts. The byproducts sodium formate and sodium carbonate, which become enriched steadily more strongly in the event of such a recirculation, cause interference in particular. This would make continuous disposal of the sodium cyanide mother liquor necessary, which would result in a low yield of the process, high costs, and an unacceptable environmental strain.

Against this background, the present invention is based on the object of providing a method for producing alkali metal cyanides as solids, which avoids the above-described disadvantages.

In particular, the present invention is based on the object of providing a method for producing alkali metal cyanides, which enables the production of alkali metal cyanides as solids in the fewest possible method steps, and at the same time creates as little waste as possible, which has to be disposed of in a complex manner.

The object according to the invention is achieved by a method for producing alkali metal cyanides as solids, which comprises the following steps:

i) an absorption step in the form of an absorption of hydrogen cyanide from a synthesis gas containing hydrogen cyanide in an aqueous alkali metal hydroxide solution having a content of free alkali of 2 to 10 wt. %, in an absorber at a temperature of approximately 35° C. to 75° C., preferably between 45° C. and 60° C. directly behind the feed point of the synthesis gas and a pressure of approximately 1120 to 1600 mbar (a) to produce an aqueous alkali metal cyanide solution;

ii) a crystallization step in the form of the introduction of the alkali metal cyanide solution into an evaporative crystallizer, which is heated by steam heating so that at the contact surface of the heating element with alkali metal cyanide solution, a temperature of approximately 60-100° C., preferably approximately 70-90° C. is provided, and in which a pressure of approximately 30-100 mbar (a), preferably 60-65 mbar is provided;

iii) a separation step in the form of the separation of the alkali metal cyanide crystals formed from the mother liquor by centrifuging, in particular by means of discontinuously operating peeler centrifuges;

iv) a recirculation step in the form of the recirculation of X vol. % of the mother liquor separated in step iii) into the absorption and the recirculation of (100-X) vol. % of the mother liquor separated in step iii) into the crystallization according to step ii);

v) a drying step in the form of the drying of the alkali metal cyanide crystals separated in step iii), wherein the drying step is designed in particular so that the separated alkali metal cyanide crystals are dried by means of a contact dryer connected downstream and the degree of drying of the alkali metal cyanide crystals can be set individually from batch to batch.

An entirely essential step of the method according to the invention is the partial recirculation of the alkali cyanide mother liquor into the absorption process, i.e., the step of the reaction of the synthesis gas containing hydrogen cyanide with the alkali metal hydroxide solution. The remaining component of the mother liquor separated in separation step iii) is recirculated in this case into the crystallization according to step ii).

Overall, complete recirculation of the mother liquor separated in the separation step iii) thus takes place, wherein the component X vol. % is recirculated into the absorption step i) and the remaining component (100-X) vol. % is recirculated into the crystallization step ii). Surprisingly, it has been shown that by way of this divided manner of recirculation of the mother liquor obtained in step iii), in synergistic cooperation with further features of the method according to the invention, a completely closed loop can be achieved, in which mother liquor containing alkali metal cyanide does not have to be disposed of.

The setting according to the invention of the parameters in the crystallization step ii) is of particular significance in this case.

It is fundamentally true in this case that the formation of byproducts, in particular in the form of alkali metal formates, is promoted by the rising temperature during the crystallization step in the evaporative crystallizer. Under this aspect, the operation should thus be as cold as possible. However, it is problematic here that at low temperatures, very small alkali metal cyanide crystals form, which are only separable with great difficulty in the separation step iii). By way of the cooperation according to the invention of heating in the crystallization step by vapor heating in such a manner that a temperature of approximately 60-100° C., preferably approximately 70-90° C., is provided on the contact surface of the heating element to the alkali metal cyanide solution, with vacuum generation in the crystallization step, so that a pressure of approximately 30-100 mbar, preferably 60-65 mbar is provided, it is possible to suppress the formation of byproducts, in particular in the form of formates, sufficiently and to achieve good crystal sizes simultaneously.

The heating of the crystallization solution in step ii) is typically performed in this case by a pipe bundle heat exchanger which is heated using steam on the jacket side. In this case, vacuum steam is preferably used, so that temperatures of approximately 70-100° C., typically approximately 70-90° C. are achieved. The formation of byproducts, in particular in the form of formates, can be substantially suppressed by these low temperatures.

On one hand, sufficient crystal sizes are achieved by the interaction of these method parameters with respect to the heating with the vacuum generation in which a pressure of approximately 30-100 mbar, preferably approximately 60-65 mbar is provided. Crystal sizes of approximately 100-120 μm are desired. Nearly complete separation of the crystallized-out alkali metal cyanides from the crystallization solution is thus possible.

At the same time, the formation of byproducts, in particular in the form of formates, can be suppressed so substantially that in cooperation with the procedure according to the invention of the partial recirculation of the mother liquor separated in step iii) into the absorption (step i)) and recirculation of the remaining part of the mother liquor into the crystallization (step ii)) it is thus possible for the first time to produce a closed loop of the alkali metal cyanide solution. The method according to the invention therefore enables the production of alkali metal cyanide as a solid in good quality with only minor contaminants, wherein at the same time no wastewater containing alkali metal cyanide results, which has to be disposed of in a costly and environmentally-harmful manner.

In one particularly preferred embodiment, an alkali metal cyanide in the form of sodium cyanide is produced by the method according to the invention. In this case, sodium hydroxide (sodium hydroxide solution) is used in step i) as the alkali metal hydroxide solution.

A further advantage of the method according to the invention is that in step i), the synthesis gas containing hydrogen cyanide can be used as a non-purified gas mixture directly from an Andrussow process. It is possible by way of the method control according to the invention to bring the HCN-containing gas mixture formed in an Andrussow process directly into reaction with the alkali metal hydroxide solution without any interposed purification step.

In one particularly preferred embodiment, the alkali metal cyanide crystals formed in step iii) have a grain size distribution having grain sizes d50 of approximately 50-200 μm, in particular approximately 100-120 μm.

It has also proven to be particularly advantageous for the separation of the formed alkali metal cyanide crystals in step iii) to be performed at a solid concentration of approximately 5-40 mass-%, in particular approximately 10-30 mass-%.

It has proven to be particularly advantageous if in the recirculation step iv), the recirculation is performed so that the percentage component X vol. % of the mother liquor separated in step iii), which is recirculated into the absorption (step i)), is approximately 5-40 vol. %, in particular approximately 10-20 vol. %. Accordingly, the component (1-X) vol. % of the mother liquor separated in step iii), which is recirculated into the crystallization (step ii)), is advantageously approximately 60-95 vol. %, in particular approximately 80-90 vol. %.

In one particularly preferred embodiment, the method according to the invention is designed so that the steps i), ii), iii), and iv) represent a closed loop with respect to the mother liquor separated in step iii), in the case of which no mother liquor containing alkali metal cyanide has to be discarded over numerous method cycles.

To enable a method control which makes the alkali metal cyanide accessible as a solid in the highest possible yield and the highest possible purity, in step i), the alkali metal hydroxide is preferably continuously measured and regulated, so that the optimum concentration of the alkali metal hydroxide is always provided. It is possible by way of this continuous measurement and regulation to always keep the content of free alkali metal hydroxide in the solution in the desired range of approximately 2-10 wt. %.

In one preferred embodiment, the drying step v) of the drying of the alkali metal cyanide crystals separated in step iii) is performed so that the drying occurs in a contact dryer with forced circulation at a temperature of the heating medium of approximately 180-400° C., preferably approximately 185-250° C.

Particularly good results are achieved in this case if the alkali metal cyanide crystals separated in step iii) pass through an upstream preheater before the drying step v) and in this case evening out of the discontinuous product flow between the peeler centrifuges and the contact dryer is achieved simultaneously.

The interaction of dryer and preheater is preferably designed in this case so that dryer and preheater are flushed with a preheated airflow such that targeted air guiding from the outside to the inside and from dry to damp occurs.

A further special advantage of the method according to the invention is that in step i), a synthesis gas containing hydrogen cyanide can be used, for the production of which natural gas having a methane content of approximately 98 mass-% can be used without special prior purification for the Andrussow process. The reaction product of the Andrussow process which was produced from a natural gas thus used having a methane content of approximately 98 mass-% can be used directly for absorption in step i) without intermediate purification steps.

In one preferred embodiment of the method according to the invention, the step v) is followed by a further step vi) in the form of a pulverization step, wherein a setting of the maximum size of approximately 10 mm for optimizing the subsequent briquetting is performed for pulverizing contacts of the alkali metal cyanide crystal flow from step v).

The present invention also relates to an alkali metal cyanide, in particular in the form of sodium cyanide, which is produced according to the method according to the invention.

The method according to the invention has numerous advantages in relation to the previous methods for producing alkali metal cyanides. In relation to previous methods for producing alkali metal cyanides as solids, it is possible by way of the method according to the invention to bring the synthesis gas containing hydrogen cyanide directly to reaction with the alkali metal hydroxide solution, without any condensation and purification steps. This results in substantially simpler method control and savings of cost. Nonetheless, alkali metal cyanide can be produced as a solid in good quality with only minor contaminants by the method according to the invention. At the same time, it is possible due to the synergistic interaction of the method parameters according to the invention to provide a closed loop of the mother liquor containing alkali metal cyanide obtained after the separating step, in which no or only little wastewater containing alkali metal cyanide results, which has to be disposed of in a costly and environmentally-harmful manner.

The invention claimed is:

1. A method for producing alkali metal cyanides as solids, comprising the following steps:
   i) an absorption step in the form of an absorption of hydrogen cyanide from a synthesis gas containing hydrogen cyanide in an aqueous alkali metal hydroxide solution having a content of free alkali of approximately 2 to 10 wt. %, in an absorber at a temperature of approximately 35° C. to 75° C. directly after the feed point of the synthesis gas, and a pressure of approximately 1120 to 1600 mbar (a) to produce an aqueous alkali metal cyanide solution;
   ii) a crystallization step in the form of the introduction of the alkali metal cyanide solution into an evaporative crystallizer, which is heated by steam heating so that at the contact surface of the heating element with alkali metal cyanide solution, a temperature of approximately 60-100° C. is provided, and in which a pressure of approximately 30-100 mbar (a) is provided;
   iii) a separation step in the form of the separation of the alkali metal cyanide crystals formed from the mother liquor by centrifuging;
   iv) a recirculation step in the form of the recirculation of approximately X vol. % of the mother liquor separated in step iii) into the absorption and the recirculation of approximately (100-X) vol. % of the mother liquor separated in step iii) into the crystallization according to step ii);
   v) a drying step in the form of the drying of the alkali metal cyanide crystals separated in step iii).

2. The method according to claim 1, characterized in that sodium cyanide is formed as the alkali metal cyanide.

3. The method according to claim 1, characterized in that a non-purified gas mixture from an Andrussow process is used as the hydrogen cyanide synthesis gas.

4. The method according to claim 3, characterized in that in step i), a synthesis gas containing hydrogen cyanide can be used, for the production of which natural gas having a methane content of approximately 98 mass-% was used without special prior purification for the Andrussow process and therefore for the production of a synthesis gas containing hydrogen cyanide.

5. The method according to claim 1, characterized in that the alkali metal cyanide crystals formed in step iii) have a grain size distribution having crystal sizes d50 of approximately 50-200 μm.

6. The method according to claim 5, characterized in that the alkali metal cyanide crystals formed in step iii) have a grain size distribution having crystal sizes d50 of approximately 100-120 μm.

7. The method according to claim 6, characterized in that in step iii), the separation of the formed alkali metal cyanide crystals is performed at a solid concentration of approximately 10-30 mass-%.

8. The method according to claim 5, characterized in that in step iii), the separation of the formed alkali metal cyanide crystals is performed at a solid concentration of approximately 5-40 mass-%.

9. The method according to claim 1, characterized in that in step iii), the separation of the formed alkali metal cyanide crystals is performed at a solid concentration of approximately 5-40 mass-%.

10. The method according to claim 9, characterized in that in step iii), the separation of the formed alkali metal cyanide crystals is performed at a solid concentration of approximately 10-30 mass-%.

11. The method according to claim 1, characterized in that in step iv), the percentage component X vol. % is approximately 5 to 40 vol. %.

12. The method according to claim 11, characterized in that in step iv), the percentage component X vol. % is approximately 10 to 20 vol. %.

13. The method according to claim 12, characterized in that the steps i), ii), iii), and iv) represent a closed loop with respect to the mother liquor separated in step iii), in which no mother liquor containing alkali metal cyanide has to be discarded.

14. The method according to claim 11, characterized in that the steps i), ii), iii), and iv) represent a closed loop with respect to the mother liquor separated in step iii), in which no mother liquor containing alkali metal cyanide has to be discarded.

15. The method according to claim 1, characterized in that the steps i), ii), iii), and iv) represent a closed loop with respect to the mother liquor separated in step iii), in which no mother liquor containing alkali metal cyanide has to be discarded.

16. The method according to claim 1, characterized in that the concentration of free alkali hydroxide in the absorption (step i) is continuously measured and regulated.

17. The method according to claim 1, characterized in that the alkali metal cyanide crystals separated in step iii) are dried in step v), wherein the drying is performed in a contact dryer having forced circulation at a temperature of the heating medium of approximately 180 to 400° C.

18. The method according to claim 17, characterized in that the drying is performed in the contact dryer having forced circulation at a temperature of the heating medium of approximately 185 to 250° C.

19. The method according to claim 1, characterized in that in step i), a synthesis gas containing hydrogen cyanide can be used, for the production of which natural gas having a methane content of approximately 98 mass-% was used without special prior purification for the Andrussow process and therefore for the production of a synthesis gas containing hydrogen cyanide.

20. The method according to claim 1, characterized in that after step v), a further step vi) follows in the form of a pulverization step, wherein a setting of the maximum size of approximately 10 mm for optimizing the subsequent briquetting is performed for pulverizing compactions of the alkali metal cyanide crystal flow from step v).

21. The method according to claim 1, characterized in that in the absorption step the absorption is conducted in the absorber at a temperature between approximately 45° C. and 60° C. directly after the feed point of the synthesis gas.

22. The method according to claim 1, characterized in that in the crystallization step at the contact surface of the heating element with the alkali metal cyanide solution, a temperature of approximately 70-90° C. is provided.

23. The method according to claim 22, characterized in that in the crystallization step in the evaporative crystallizer a pressure of 60-65 mbar is provided.

24. The method according to claim 1, characterized in that in the crystallization step in the evaporative crystallizer a pressure of 60-65 mbar is provided.

25. The method according to claim 1, characterized in that in the separation step the centrifuging is conducted by means of discontinuously operating peeler centrifuges.

26. The method according to claim 25, characterized in that the alkali metal cyanide crystals separated in step iii) pass through a preheater upstream of the drying and simultaneously a balancing of the discontinuous product flow between the peeler centrifuges and the contact dryer is achieved.

27. The method according to claim 26, characterized in that dryer and preheater are flushed using a preheated airflow such that targeted air guiding from the outside to the inside and from dry to damp occurs.

28. The method according to claim 1, characterized in that the drying step is designed so that the separated alkali metal cyanide crystals are dried by means of a downstream contact dryer and the degree of drying of the alkali metal cyanide crystals can be set individually from batch to batch.

\* \* \* \* \*